(12) United States Patent
Joffe

(10) Patent No.: US 6,559,980 B1
(45) Date of Patent: May 6, 2003

(54) INCREASING SPEED OF NON-ERROR CORRECTED FAX TRANSMISSIONS

(75) Inventor: Neil Raymond Joffe, Palo Alto, CA (US)

(73) Assignee: Cisco Systems, Inc., San Jose, CA (US)

( * ) Notice: Subject to any disclaimer, the term of this patent is extended or adjusted under 35 U.S.C. 154(b) by 0 days.

(21) Appl. No.: 09/227,643

(22) Filed: Jan. 8, 1999

(51) Int. Cl.[7] .............. H04N 1/32; H04N 1/41; H04N 1/00; G06F 13/00
(52) U.S. Cl. .............. 358/442; 358/431; 358/434; 358/1.15
(58) Field of Search ............... 358/1.15, 401, 358/405, 406, 426, 431, 434, 435, 436, 438, 439, 440, 442, 443; 379/100.01, 100.17

(56) References Cited

U.S. PATENT DOCUMENTS

| | | | |
|---|---|---|---|
| 4,918,722 A | 4/1990 | Duehren et al. | 379/100 |
| 5,159,465 A | * 10/1992 | Maemura et al. | 358/405 |
| 5,291,546 A | 3/1994 | Giler et al. | 379/100 |
| 5,369,686 A | 11/1994 | Dutra et al. | 379/94 |
| 5,488,651 A | 1/1996 | Giler et al. | 379/100 |
| 5,539,531 A | * 7/1996 | Propach et al. | 358/426 |
| 5,546,388 A | * 8/1996 | Lin | 370/389 |
| 5,712,907 A | 1/1998 | Wegner et al. | 379/112 |
| 5,767,985 A | 6/1998 | Yamamoto et al. | 358/402 |
| 5,805,298 A | 9/1998 | Ho et al. | |
| 5,812,278 A | 9/1998 | Toyoda et al. | 358/402 |
| 5,838,683 A | 11/1998 | Corley et al. | 370/408 |
| 6,038,037 A | * 3/2000 | Leung et al. | 358/434 |
| 6,160,639 A | * 12/2000 | Lutgen et al. | 358/442 |
| 6,339,481 B1 | * 1/2002 | Scott | 358/442 |

FOREIGN PATENT DOCUMENTS

WO  WO 97/18665  5/1997  ............ H04N/1/00

* cited by examiner

Primary Examiner—Madeleine Nguyen
Assistant Examiner—Joseph R. Pokrzywa
(74) Attorney, Agent, or Firm—Law Offices of Imam

(57) ABSTRACT

A fax system employed in a packet switching network environment for use by fax users for transmission of fax information includes a network device coupled, through a network interface, to one or more communications devices for transmitting a processed fax message through the network interface to one or more of the communications devices, each of the communications devices being capable of receiving fax information and having a predetermined minimum scan line time therefor. Prior to the transmission of the processed fax message, the network interface being adapted to transfer a first frame from the communications devices to the network device, said first frame for indicating whether or not a particular communications device supports Error Correction Mode (ECM) and if the particular communications device supports ECM, the network device for transmitting fax information through the network interface to the particular communications device using approximately zero minimum scan line time, wherein fax information is transmitted at a fast speed through the use of zero minimum scan line time thereby decreasing costs to the users of the fax system.

13 Claims, 4 Drawing Sheets

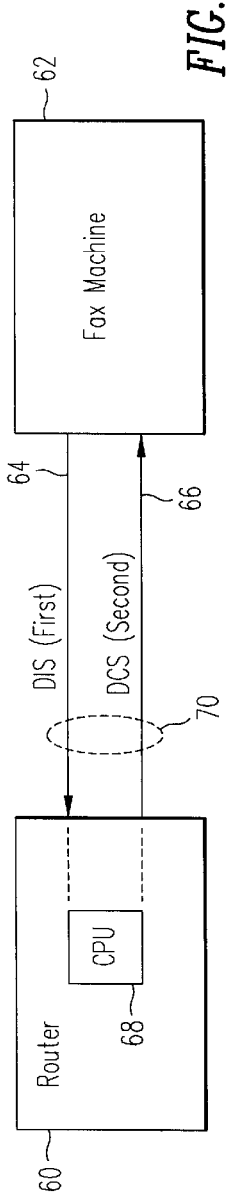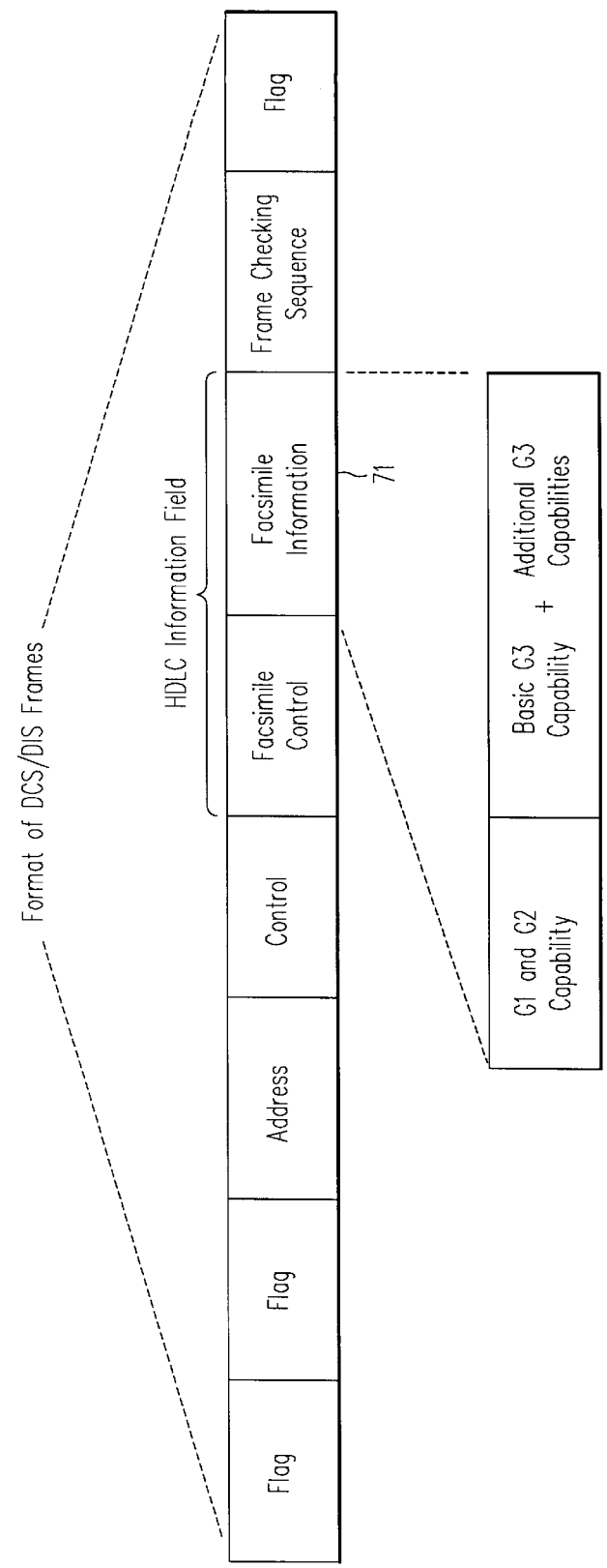

INCREASING SPEED OF NON-ERROR CORRECTED FAX TRANSMISSIONS

BACKGROUND OF THE INVENTION

1. Field of the Invention

This invention relates to the field of data transmission systems, and particularly data transmission systems employing networking equipment for transmission of digital information in the form of facsimile transmission to various communications equipment.

2. Description of the Prior Art

Facsimile (fax) devices are a popular mechanism for transmission of information. The recent advancement of technology has led to the development of many types of fax devices.

One of the distinguishing factors among the different types of fax devices is the minimum scan line time requirement of each type of device. The minimum scan line time is defined as the minimum amount of time required between the end of reception of a faxed line of information and the reception of the next faxed line of information. In older fax machines, this minimum scan line time tended to be longer in duration, whereas in more recently-developed fax machines, the minimum scan line time is much smaller or even zero.

Even more recently-developed fax machines utilize error correction algorithms to detect and correct errors. These types of fax machines generally include memory or storage space, for example, 64 Kbytes of Random Access Memory (RAM), for storing fax information that is then processed for use by a fax user. During such processing, errors are detected and corrected in those fax machines supporting error correction mode (ECM). The inclusion of memory in fax machines allowed manufacturers of fax machines to implement ECM capability in such machines, which in turn resulted in the capability to send information using very short or zero minimum scan line times.

While manufacturers of fax machines have recently included ECM capability in their fax machines, for the most part they have failed to update the algorithms included in the fax machines which do not have ECM capability. In fact, even those machines that do have ECM capability do not include updated algorithms to account for the update in ECM capability thereby resulting in fax transmissions having a minimum scan line time exceeding that which is actually necessary.

Longer scan line times effectively increase transmission times thereby resulting in longer telephone calls with added costs to the fax user. Furthermore, longer scan line times decrease transmission line throughput thereby preventing the use of an otherwise larger number of fax machines for simultaneous transmission of information thereto.

Therefore, a method and apparatus is needed for increasing the effective transmission time for transferring fax information to one or more fax machines through a packet switching network environment.

SUMMARY OF THE INVENTION

Briefly, a preferred embodiment of the present invention includes a fax system employed in a packet switching network environment for use by users for transmission of fax information and including a network device coupled, through a network interface, to one or more communications devices for transmitting a processed fax message through the network interface to one or more of the communications devices, each of the communications devices being capable of receiving fax information and having a predetermined minimum scan line time therefor. Prior to the transmission of the processed fax message, the network interface is adapted to transfer a first frame from the communications devices to the network device, said first frame for indicating whether or not a particular communications device supports Error Correction Mode (ECM) and, if the particular communications device supports ECM, the network device for transmits fax information through the network interface to the particular communications device using approximately zero minimum scan line time, thereby decreasing costs to the users of the fax system.

These and other objects and advantages of the present invention will no doubt become apparent to those skilled in the art after having read the following detailed description of the preferred embodiment illustrated in several figures of the drawings.

IN THE DRAWING

FIG. 3a shows an example of the communication of fax information between a router and a fax machine in accordance with an embodiment of the present invention.

FIG. 3b shows the format of the DIS and DCS frames.

DETAILED DESCRIPTION OF THE PREFERRED EMBODIMENTS

The present invention relates to another invention disclosed in concurrently-filed U.S. patent application Ser. No. 09/227,115, entitled "FAX BROADCAST FROM A SINGLE COPY OF DATA" with Neil Joffe and Greg Mercurio being co-inventors thereof and filed on Jan. 8, 1999, the disclosure of which is incorporated herein by reference as though set forth in full.

Figure 1:
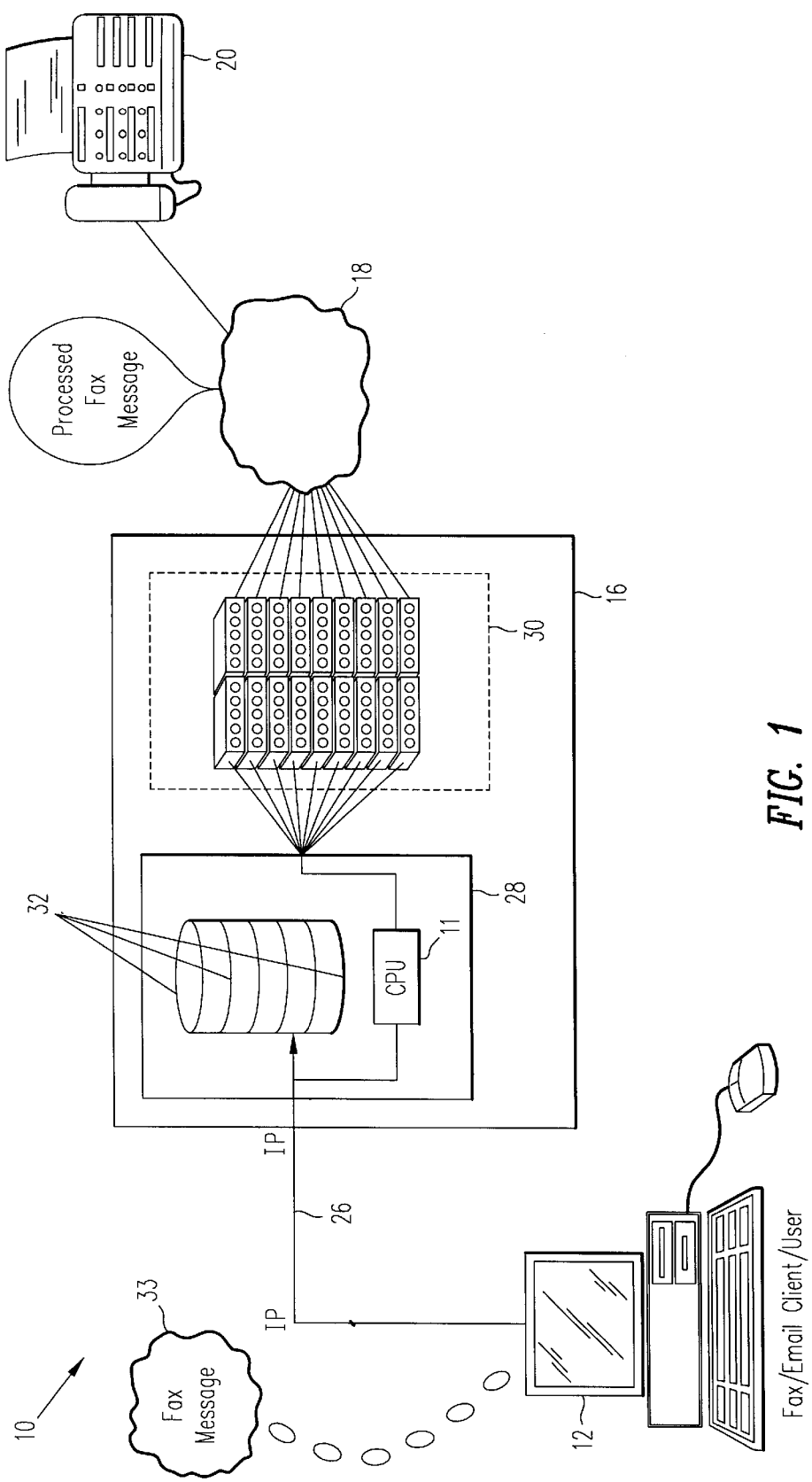
FIG. 1 shows, in conceptual general form, a fax broadcasting including networking device in accordance with a preferred embodiment of the present invention.

Referring now to FIG. 1, a fax system 10 is shown to include a sending communications device 12, such as a Personal Computer (PC), a fax machine or any other type of communications device capable of transmitting fax information, for sending information, in the form of a fax message 33, to a networking device 16. The networking device 16 processes the fax message 33. The networking device 16, which may be a network router device, transfers the processed fax message 14 through telephone company (Telco) transmission lines 18 to a receiving communications device 20, which receives the processed fax message and transforms the same for use by users of the communications device (users are not shown in FIG. 1). The communications device 20 may be a PC, fax machine or any other communications device capable of receiving fax information.

The sending communications device 12 is coupled to the networking device 16 through a communication interface 26 for transferring digital information, such as fax messages, therethrough. The communication interface 26 is used for coupling information in a format or protocol adopted and recognized by the industry at-large, referred to as the Transmission Control Protocol/Internet Protocol (TCP/IP). This standard is viewed as a 'layer' within the 'layers' of the Internet communication structure. In fact, a typical use of the fax system 10 of FIG. 1 is the Internet environment, which is a digital networking environment using packet switching network protocols for transferring information, generally in digital form, between various types of communications such as computer equipment.

Routers, as an example of the networking device 16, are commonly employed to direct the flow of data over networks, such as the Internet. In FIG. 1, the networking device 16 includes a processing device 28 coupled to a modem bank 30. The processing device 28 receives information that is originally sent by the communications device 12, processes the same for use by the modem bank 30, which in turn, transfers digital information, such as fax messages, in the form of packets, to the communications device 20.

The processing device 28 includes a Central Processing Unit (CPU) 11, which through the execution of a software program, the binary version of which is stored in memory within the processing device 28 (memory is not shown in FIG. 1), causes processing and transferring of messages that are sent by the communications device 12.

In operation, a fax message 33 is transferred from the communications device 12 to the networking device 16 through the communication interface 26. The fax message 33 is then received by the networking device 16 in packet form. That is, the message is broken up into portions or packets, which are transferred at different times to the networking device 16 and these packets are similarly received at different times by the networking device 16.

As each packet is received by the networking device 16, it is stored into a particular storage space, or buffer 32 for transmission to the communications device. It should be noted that more than one communications device 20 may be employed in alternative embodiments of the present invention so that the processed fax message 14 is received by a plurality of devices.

As each packet of the fax message 33 is received and stored accordingly by the networking device 16, it is then transmitted through the bank of modem devices 30, as the processed fax message 14, through the transmission lines 18 to the communications device 20, such as a fax machine, for use by various users.

The transmission lines 18 is typically a T1 type of communications link carrying information in a Time Division Multiplexed format over a Public Switched Telephone Network (PSTN). The processed fax information 14 is transferred to the communications devices 20 in accordance with a facsimile communications protocol as defined by the International Telecommunication Union (ITU) Group III over the PSTN (Packet Switching Transmission Network).

One of the specifications associated with fax machines is referred to as minimum scan line time, which defines the minimum amount of time required between the end of reception of a line of information and the reception of the next line of information. In older fax machines, this minimum scan line time tended to be longer whereas in more recently-developed fax machines, the minimum scan line time is much smaller or even zero.

As earlier noted, recent fax machines include memory for storing, for example, the fax message being received and thereafter the message is processed for use by the fax user. Memory in the form of DRAM, SRAM or other types of memory are typically used for this purpose.

Figure 2:
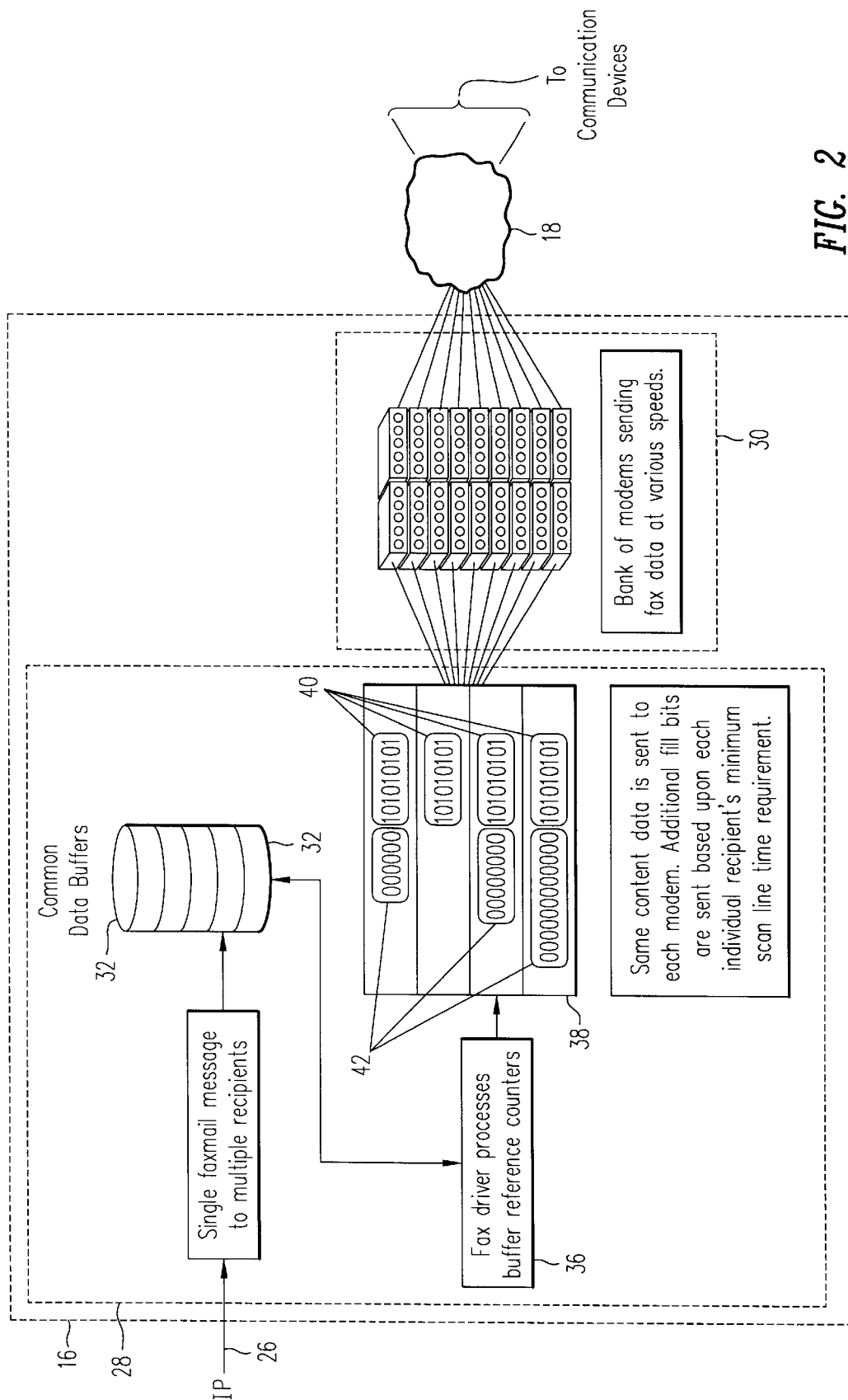
FIG. 2 illustrates more details of the networking device 16 of FIG. 1 in accordance with a preferred embodiment of the present invention.

In FIG. 2 depicts further, details of the networking device 16 of FIG. 1 in conceptual form. The fax message 33 (shown in FIG. 1) is coupled onto the communication interface 26, in packet form, for use by the networking device 16 as discussed above. The received message is stored, in packet form, in a corresponding storage space 32.

In the case where reference count numbers are employed, when a packet is transferred out from its storage space 32 to one of the plurality of communication devices 20, the reference count, which is developed by a counter within the block 36, is decremented by one. The block 36 represents, in conceptual form, the structure that includes the processor 28 (shown in FIG. 1).

A fill bit generator block 38 generates fill bits on an as-needed basis for transmission with the fax message. Fill bits, generally represented by the binary value '0', are appended to the fax data or message prior to the latter's transmission to the communications device 20 through the modem bank 30. As noted earlier, each type of fax machine may have associated therewith, a different minimum scan line time requirement. Accordingly, the longer the requirement for the minimum scan line time, the greater the number of fill bits that are necessary for appending to the fax data.

In the present invention, when a fax machine is detected as one employing Error Correction Mode (ECM), the fax message is transmitted to the fax machine using zero minimum scan time. This is because flax machines that have ECM capability would have included therein memory structure(s) for temporarily storing the in-coming fax message and for performing error detection and correction processing thereafter on the message. Additionally, regardless of ECM capability, today's fax machines commonly include memory for temporary storage of fax data and for future print-out of the same to the user. Indeed, fax machines today have the capability to store multiple messages before providing these messages to users at different times. Those familiar with the use of fax machines have most likely encountered situations where a fax is received yet not provided to the user until later either specified or unspecified time. The detection of ECM capability for fax machines in accordance with the present invention will be discussed in further detail with respect to other figures in this document.

In FIG. 2, the block 38 shows four different fill bit insertion lengths. That is, the packet fax data 40 being transmitted is '101010101' in binary notation and each of the fill bits 42 is of a different length thereby accommodating different minimum scan line requirements. The first fill bit insertion is shown in binary notation to be six zeros or '000000' and there is no fill bit insertion for the next packet fax data 40, followed by eight fill bits being inserted into the third packet and twelve fill bits inserted into the last packet. It should be noted that the same data, i.e. '101010101' is being transmitted to each of the modem bank 30 with the latter receiving these packets and sending the same at different speeds which correspond to the speed of the fax machines receiving the packets. This is perhaps best understood with the use of the following examples.

FIG. 3a is presented to show an example of a fax communication system in accordance with an embodiment of the present invention. In FIG. 3a, a router 60 is shown to include a CPU 68. The router 60 is shown coupled to a fax machine 62 through a network interface 70. While not shown, the router 60 receives fax information from the Internet for transmission thereof ultimately to the fax machine through the network interface 70.

The router 60 and the fax machine 62 establish communication with each other through the use of a predetermined protocol, which is part of an industry standard and will be discussed in more detail later. For now it should be noted that there are two types of frames of information exchanged between the router 60 and the fax machine 62 through the network interface 70, namely a Digital Information Signal (DIS) frame 64 and a Digital Command Signal (DCS) frame 66. The format of the DIS/DCS frames is shown in FIG. 3b and the bits within the frames is defined in Table 1 attached hereto. As shown in FIG. 3b, a Fascimile Information field 71 includes fax data and the remaining fields include flag, address and other header type of information. In Table 1, it should be noted that bits 21–23 are used for indicating the minimum scan line time of the corresponding fax machine and bit 27 is used for indicating whether or not ECM is supported by the corresponding fax machine.

Initially, or at the outset of a fax call, the the fax machine 62 sends header type of information to the router 60 and the router 60, in turn, responds by sending reply header information back to the fax machine 62. This handshaking is done for the purposes of establishing an acceptable communication link and the like. For example, in FIG. 3a, at the outset of a fax call, the fax machine 62 couples the Digital Information Signal (DIS) frame 64 onto the network interface 70 for use by the router 60. The router 60, in turn, sends the Digital Command Signal (DCS) frame 66, through the network interface 70. The DIS and DCS frames, 64 and 66, respectively, are defined as part of an industry-standard protocol, such as the T.30 protocol, pertaining to the transmission and reception of fax information.

Generally, a frame is a collection of bytes (each byte being 8-bits in length) of information that are grouped together according to a predetermined format for transfer from one communication device to another. In one embodiment of the present invention, a frame includes 256 bytes of information although other number of bytes of information may be employed without departing from the spirit of the present invention.

Figure 4:
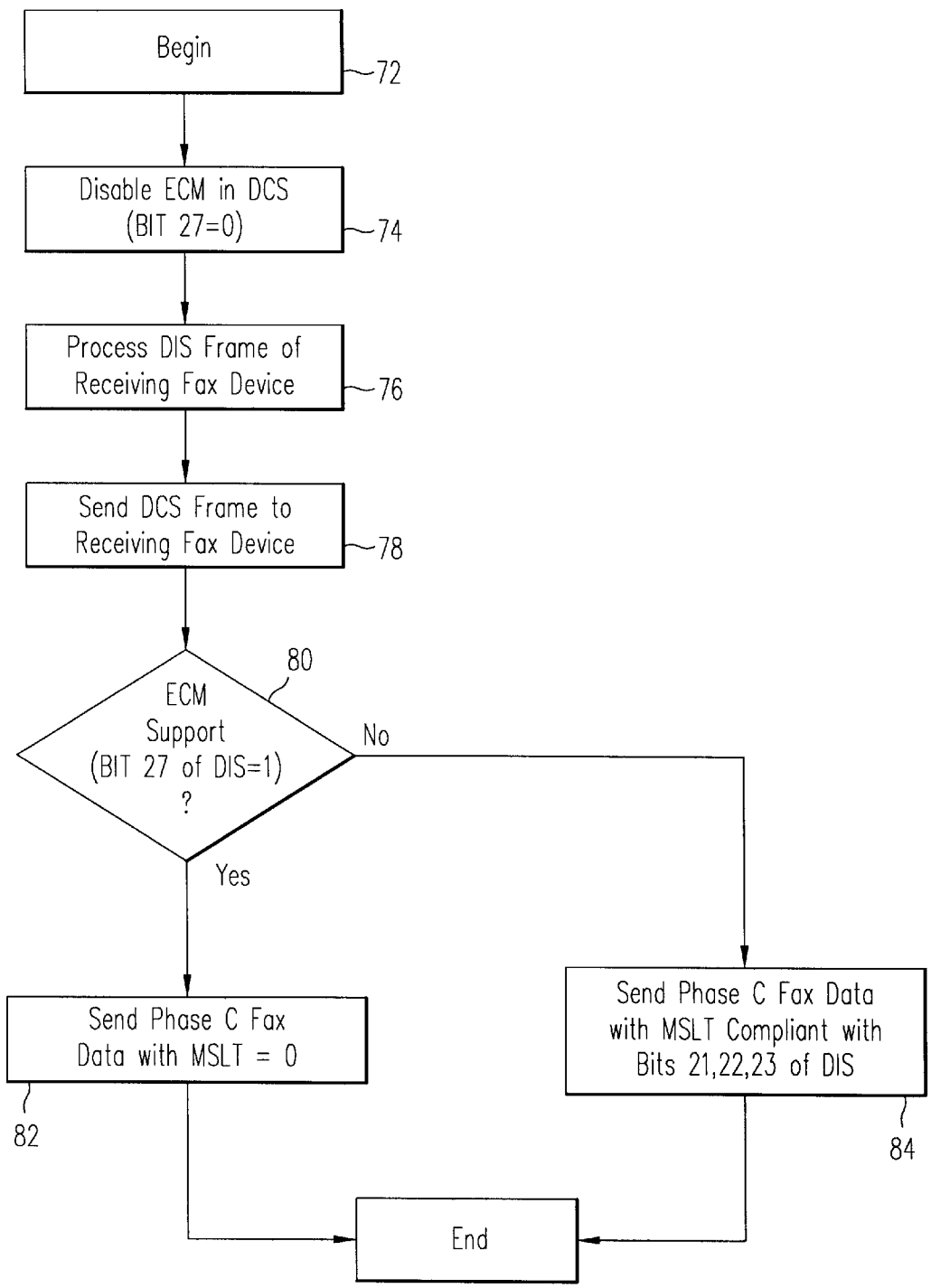
FIG. 4 shows a flow chart outlining the steps performed in communicating fax information in accordance with an embodiment of the present invention.

FIG. 4 shows a flow chart of the steps performed by the fax system 10 (in FIG. 1) for transmitting fax information. Generally, the steps outlined in FIG. 6 are performed by the CPU 68 (shown in FIG. 3a) and/or the CPU 11 (shown in FIG. 1) by executing a software program (not shown in either figure).

At step 74 in FIG. 4, at the outset of a fax call, bit 27 is set to logical state '0', to disable ECM. This bit 27 is a part of the DCS frame 66 (in FIG. 3a) and it represents whether or not ECM is activated. While the DCS frame itself is not transmitted and in fact prior to its transmission by the router 60 (shown in FIG. 5), ECM is disabled.

At step 76 in FIG. 4, the DIS frame 64 is transmitted by the fax machine 62 and received and processed by the router 60. The DIS frame 64 identifies particular characteristics of the fax machine 62. Next, at step 78, the router 60 sends a DCS frame 66 to the fax machine 62. This transmitted DCS frame 66 includes the disabled ECM bit, or bit 27, as discussed with respect to step 74.

Next, at 80, the router 60 (in FIG. 4) checks the DIS frame 64 that was received from the fax machine 62 for determining whether or not ECM capability is supported by the fax machine 62. The DIS frame 64 includes a bit, namely bit 27 that identifies this information.

If, at 80, a determination is made that ECM is supported by fax machine 62, the process continues to step 82 where fax data is transmitted from the router 60 to the fax machine 62 using zero minimum scan line time. Otherwise, if at 80, a determination is made that ECM is not supported by the fax machine 62, the process goes on to step 84 to send fax data using the particular minimum scan line time that is defined by the fax machine 62. The particular minimum scan line time is defined by bits 21–23 of the DIS frame 64 (typical minimum scan line times are 5, 10 or 20 milliseconds zero minimum scan line times may also be employed although they are not common however, in the latter case, as will be discussed in more detail shortly, no fill bits are required to be sent with each scan line), the latter being sent by the fax machine 62 to the router 60 as discussed above. Fulfilling the particular minimum scan line time requirement requires the use of fill bits as earlier noted (see the discussion above with respect to FIG. 2). Fill bits are generated by the fill bit generator block 38. The number of fill bits used, i.e. zeros, is a function of the particular minimum scan line time requirement. It should be noted that while certain bit positions have been indicated with respect to FIG. 6 for identifying certain type of information, the same information may be alternatively communicated between the fax machine 62 and the router 60 in a different format without departing from the spirit of the present invention.

In prior art systems, as previously discussed, regardless of having ECM capability, the minimum scan line time specified for each fax machine is used to transmit information to the fax machine.

In an embodiment of the present invention, as described hereinabove, information is transferred to a fax machine using zero minimum scan line times (it should be noted that zero minimum scan line time refers to a scan line time of approximately zero, i.e. ½ millisecond, and not necessarily exactly zero) so long as ECM is supported by the subject fax machine. This substantially increases the rate of transfer of information and reduces costs for completing a fax call to the user. It has been the inventor's experience that 10 seconds may be saved for each page of fax information transmitted when information is being transmitted to a fax machine requiring 10 milliseconds of minimum scan line time. As earlier noted, a zero minimum scan line time requires no fill bits to be sent for each scan line.

It should be noted that the minimum scan line time requirement is ignored or treated as being zero when a fax machine is detected as one that supports ECM. This may be done due to the presence of memory within the fax machine, as earlier discussed. Accordingly, use of an embodiment of the present invention effectuates rapid transfer of information to fax machines thereby resulting in higher system throughput. Moreover, costs to users of fax machines in accordance with the present invention may be substantially reduced.

Although the present invention has been described in terms of specific embodiments it is anticipated that alterations and modifications thereof will no doubt become apparent to those skilled in the art. It is therefore intended that the following claims be interpreted as covering all such alterations and modifications as fall within the true spirit and scope of the invention.

TABLE 1

| Bit No. | DIS/DTC | DCS |
| --- | --- | --- |
| 1 | Transmitter T.2 operation | |
| 2 | Receiver - T.2 operation | Receiver - T.2 operation |
| 3 | T.2 IOC = 176 | T.2 IOC = 176 |
| 4 | Transmitter - T.3 operation | |
| 5 | Receiver - T.3 operation | Receiver - T.3 operation |
| 6 | Reserved for future T.3 operation features | |

TABLE 1-continued

| Bit No. | DIS/DTC | DCS |
|---|---|---|
| 7 | Reserved for future T.3 operation features | |
| 8 | Reserved for future T.3 operation features | |
| 9 | Transmitter - T.4 operation | |
| 10 | Receiver - T.4 operation | Receiver - T.4 operation |
| 11, 12, 13, 14 | Data signalling rate | Data signalling rate |
| 0, 0, 0, 0 | V.27 ter fall back mode | 2400 bit/s, V.27 ter |
| 0, 1, 0, 0 | V.27 ter | 4800 bit/s, V.27 ter |
| 1, 0, 0, 0 | V.29 | 9600 bit/s, V.29 |
| 1, 1, 0, 0 | V.27 ter and V.29 | 7200 bit/s, V.29 |
| 0, 0, 1, 0 | Not used | 14 400 bit/s, V.33 |
| 0, 1, 1, 0 | Reserved | 12 000 bit/s, V.33 |
| 1, 0, 1, 0 | Not used | Reserved |
| 1, 1, 1, 0 | V.27 ter, V.29 and V.33 | Reserved |
| 0, 0, 0, 1 | Not used | 14 400 bit/s, V.17 |
| 0, 1, 0, 1 | Reserved | 12 000 bit/s, V.17 |
| 1, 0, 0, 1 | Not used | 9600 bit/s, V.17 |
| 1, 1, 0, 1 | V.27 ter, V.29. V.33 and V.17 | 7200 bit/s, V.17 |
| 0, 0, 1, 1 | Not used | Reserved |
| 0, 1, 1, 1 | Reserved | Reserved |
| 1, 0, 1, 1 | Not used | Reserved |
| 1, 1, 1, 1 | Reserved | Reserved |
| 15 | R8 × 7.7 lines/mm and/or 200 × 200 pels/25.4 mm (See Notes 13, 14) | R8 × 7.7 lines/mm or 200 × 200 pels/25.4 mm (See Note 13) |
| 16 | Two dimensional coding capability | Two dimensional coding |
| 17, 18 | Recording width capabilities | Recording width |
| (0,0) | 1728 picture elements along scan line length of 215 mm ± 1% | 1728 picture elements along scan line length of 215 mm ± 1% |
| (0,1) | 1728 picture elements along scan line length of 215 mm ± 1% 2048 picture elements along scan line length of 255 mm ± 1% 2432 picture elements along scan line length of 303 mm ± 1% | 2432 picture elements along scan line length of 303 mm ± 1% |
| (1,0) | 1728 picture elements along scan line length of 215 mm ± 1% and 2048 picture elements along scan line length of 255 mm ± 1% | 2048 picture elements along scan line length of 255 mm ± 1% |
| (1,1) | Invalid (see Note 7) | Invalid |
| 19, 20 | Maximum recording length capability | Maximum recording length |
| (0,0) | A4 (297 mm) | A4 (297 mm) |
| (0,1) | Unlimited | Unlimited |
| (1,0) | A4 (297 mm) and B4 (364 mm) | B4 (364 mm) |
| (1,1) | Invalid | Invalid |
| 21, 22, 23 | Minimum scan line time capability at the receiver | Minimum scan line time |
| (0,0,0) | 20 ms at 3.85 l/mm: $T_{7.7} = T_{3.85}$ | 20 ms |
| (0,0,1) | 40 ms at 3.85 l/mm: $T_{7.7} = T_{3.85}$ | 40 ms |
| (0,1,0) | 10 ms at 3.85 l/mm: $T_{7.7} = T_{3.85}$ | 10 ms |
| (1,0,0) | 5 ms at 3.85 l/mm: $T_{7.7} = T_{3.85}$ | 5 ms |
| (0,1,1) | 10 ms at 3.85 l/mm: $T_{7.7} = \frac{1}{2} T_{3.85}$ | |
| (1,1,0) | 20 ms at 3.85 l/mm: $T_{7.7} = \frac{1}{2} T_{3.85}$ | |
| (1,0,1) | 40 ms at 3.85 l/mm: $T_{7.7} = \frac{1}{2} T_{3.85}$ | |
| (1,1 | 0 ms at 3.85 l/mm: $T_{7.7} = \frac{1}{2} T_{3.85}$ | 0 ms |
| 24 | Extend field | Extend field |
| 25 | 2400 bit/s handshaking | 2400 bit/s handshaking |
| 26 | Uncompressed mode | Uncompressed mode |
| 27 | Error correction mode | Error correction mode |
| 28 | Set to "0" | Frame size 0 = 256 octets Frame size 1 = 64 Octets |
| 29 | Error limiting mode | Error limiting mode |
| 30 | Reserved for G4 capability on PSTN | Reserved for G4 capability on PSTN |
| 31 | T.6 coding capability | T.6 coding enabled |
| 32 | Extend field | Extend field |
| 33 | Validity of bit/s 17, 18 | Recording width |
| (0) | Bits 17, 18 are valid | Recording width indicated by bits 17, 18 |
| (1) | Bits 17, 18 are invalid | Recording width indicated by this field bit information |
| 34 | Recording width capability 1216 picture elements along scan line length of 151 mm ± 1% | Middle 1216 elements of 1728 picture elements |
| 35 | Recording width capability 864 picture elements along scan line length of 107 mm ± 1% | Middle 864 elements of 1728 picture elements |
| 36 | Recording width capability 1728 picture elements along scan line length of 151 mm ± 1% | Invalid |
| 37 | Recording width capability 1728 picture elements along scan line length of 107 mm ± 1% | Invalid |
| 38 | Reserved for future recording width capability | |
| 39 | Reserved for future recording width capability | |
| 40 | Extend field | Extend field |
| 41 | R8 × 15.4 lines/mm (See Note 13) | R8 × 15.4 lines/mm (See Note 13) |

What I claim is:

1. A fax system employed in a packet switching network environment for use by fax users for transmission of fax information comprising:

a network router device for directing information in packet form through the packet switching network and responsive to fax information in packet form and coupled, through a network interface, to one or more communications devices, said network device storing each packet of fax information as it is received, each of the communications devices being capable of receiving fax information and having a predetermined minimum scan line time therefore and prior to the transmission of the processed fax message, the network interface being adapted to transfer a first frame from the communications devices to the network device, said first frame for indicating whether or not a particular communications device supports Error Correction Mode (ECM) and if the particular communications device supports ECM, the network device for transmitting fax information through the network interface to the particular communications device using approximately zero minimum scan line time, wherein fax information is transmitted at a fast speed through the use of approximately zero minimum scan line time thereby decreasing costs to the users of the fax system and increasing the overall fax system performance.

2. A fax system as recited in claim 1 wherein the first frame comprises Digital Information Signal (DIS).

3. A fax system as recited in claim 1 wherein the interface network is further adapted to transfer a second frame from the network device to the communications devices.

4. A fax system as recited in claim 3 wherein the second frame comprises Digital Command Signal (DCS).

5. A fax system as recited in claim 1 wherein the network device further includes a fill bit generator device for generating fill bits and transmitting the same with the fax information to the particular communications device if the particular communications device does not support ECM.

6. A fax system as recited in claim 1 wherein the network device includes a Central Processing Unit (CPU) for executing a software program to process the first frame.

7. A fax system as recited in claim 1 wherein the first frame is 256 bytes.

8. A fax system as recited in claim 1 wherein said particular communications device is a fax machine.

9. A fax system as recited in claim 1 further comprising a sending communications device coupled through a sending network interface to the network device, the sending communications device for transmitting a fax message to the network device, the network device being responsive to the fax message and being operative to develop the processed fax message.

10. A fax system as recited in claim 9 wherein the network device comprises a Central Processing Unit (CPU) for processing the fax message.

11. A fax system as recited in claim 9 wherein the sending communications device is a computer having fax transmission capability.

12. A fax system as recited in claim 9 wherein the transmission of the fax message through the sending network interface is performed pursuant to the TCP/IP standard.

13. A method for use in a packet switching network environment by fax users for transmission of fax information between a network router device and one or more communications devices through a network interface, said network device for directing information in packet form through the packet switching network, each of the communications devices capable of receiving fax information and having a predetermined minimum scan line time therefore comprising:

receiving fax information for transmission to the communications devices in packet form;

storing said packets of fax information as each packet is received;

receiving a first frame from a communications device, said first frame indicating whether or not the communications device supports Error Correction Mode (ECM);

determining, in response to the first frame, that the communications device does support ECM;

assembling the stored packets into a processed fax message; and transmitting a processed fax message through the network interface to the communications device using approximately zero minimum scan line time.

* * * * *

UNITED STATES PATENT AND TRADEMARK OFFICE
CERTIFICATE OF CORRECTION

PATENT NO. : 6,559,980 B1
DATED : May 6, 2003
INVENTOR(S) : Neil Raymond Joffe

It is certified that error appears in the above-identified patent and that said Letters Patent is hereby corrected as shown below:

<u>Title page,</u>
Item [73], Assignee, replace "Cisco Systems, Inc." with -- Cisco Technology, Inc. --.

Signed and Sealed this

Sixteenth Day of September, 2003

JAMES E. ROGAN
*Director of the United States Patent and Trademark Office*